United States Patent
Jakimov et al.

(10) Patent No.: US 9,260,784 B2
(45) Date of Patent: Feb. 16, 2016

(54) BLADE TIP COATING THAT CAN BE RUBBED OFF

(75) Inventors: Andreas Jakimov, Munich (DE); Stefan Schneiderbanger, Bergkirchen (DE); Manuel Hertter, Munich (DE)

(73) Assignee: MTU Aero Engines GmbH, Munich (DE)

( * ) Notice: Subject to any disclaimer, the term of this patent is extended or adjusted under 35 U.S.C. 154(b) by 858 days.

(21) Appl. No.: 13/384,462

(22) PCT Filed: Jul. 31, 2010

(86) PCT No.: PCT/DE2010/000909
§ 371 (c)(1),
(2), (4) Date: Jan. 17, 2012

(87) PCT Pub. No.: WO2011/015187
PCT Pub. Date: Feb. 10, 2011

(65) Prior Publication Data
US 2012/0121431 A1   May 17, 2012

(30) Foreign Application Priority Data
Aug. 6, 2009  (DE) .......................... 10 2009 036 407

(51) Int. Cl.
*F01D 5/28* (2006.01)
*C23C 24/04* (2006.01)
*F01D 11/12* (2006.01)

(52) U.S. Cl.
CPC ................ *C23C 24/04* (2013.01); *F01D 5/288* (2013.01); *F01D 11/122* (2013.01); *Y02T 50/67* (2013.01)

(58) Field of Classification Search
CPC ......... C23C 24/04; F01D 5/20; F01D 11/001; F01D 11/12; F01D 11/122
USPC .................................. 415/173.4, 174.4, 168.2
See application file for complete search history.

(56) References Cited

U.S. PATENT DOCUMENTS

| | | | |
|---|---|---|---|
| 8,192,792 B2 * | 6/2012 | Haynes et al. ................. | 427/180 |
| 2006/0166020 A1 | 7/2006 | Raybould et al. | |
| 2006/0216428 A1 * | 9/2006 | DeBiccari et al. ............ | 427/446 |
| 2006/0219330 A1 | 10/2006 | Hu et al. | |
| 2006/0222776 A1 | 10/2006 | Madhava et al. | |
| 2008/0219835 A1 * | 9/2008 | Freling et al. ............... | 415/173.4 |

FOREIGN PATENT DOCUMENTS

| | | |
|---|---|---|
| DE | 4228196 C1 | 11/1993 |
| DE | 102006029619 B3 | 7/2007 |
| DE | 102007046386 B3 | 10/2008 |
| DE | 102007056451 A1 | 5/2009 |

(Continued)

*Primary Examiner* — Ninh H Nguyen
*Assistant Examiner* — Jeffrey A Brownson
(74) *Attorney, Agent, or Firm* — Barlow, Josephs & Holmes, Ltd.

(57) ABSTRACT

The present invention relates to a method for producing a component, in particular a blade for a gas turbine, wherein a main body (2) is provided, to which a running-in layer (6) is applied, which can be worn away at least partially during operation to form an accurately fitting surface (11), wherein the running-in layer is applied by kinetic cold-gas compacting, and a component, in particular a blade for a gas turbine, comprising a main body, to which a running-in layer is applied, which can be worn away at least partially during operation to form an accurately fitting surface, wherein the running-in layer is a porous layer made of a Ti alloy.

12 Claims, 2 Drawing Sheets

(56) References Cited

FOREIGN PATENT DOCUMENTS

| | | |
|---|---|---|
| EP | 1672175 A1 | 6/2006 |
| EP | 1897972 A1 | 9/2007 |
| EP | 1921181 A1 | 10/2007 |
| EP | 1903127 A1 | 3/2008 |
| EP | 1978790 A1 | 10/2008 |
| GB | 1328426 | 8/1973 |
| JP | 59222566 A | 12/1984 |
| WO | 0234967 A1 | 5/2002 |
| WO | 2005014979 A1 | 2/2005 |
| WO | 2008144357 A1 | 11/2008 |

\* cited by examiner

BLADE TIP COATING THAT CAN BE RUBBED OFF

BACKGROUND OF THE INVENTION

1. Field of the Invention

The present invention relates to a method for producing a component, in particular a blade for a gas turbine, which comprises a main body onto which a running-in layer is applied, which is worn away at least partially during operation to form an accurately fitting surface, as well as a corresponding component, in particular a compressor blade or turbine blade for a jet turbine.

2. Prior Art

In gas turbines and particularly jet turbines, different components that must be disposed relative to one another in a very accurate fit in order to assure a high efficiency of the engine and to avoid losses are utilized both in the compressor region as well as in the turbine region. For example, care must be taken that the blades used in the compressor region and in the turbine region optimally receive flow, so that losses of efficiency do not occur due to gaps and free spaces resulting from defective fitting. This applies to rotating blades that move opposite linings or sheath rings, for example called shrouds, of the gas turbine housing, or also for stationary guide vanes opposite moving rotors that are disposed adjacent thereto.

For this purpose, so-called run-in coatings or running-in layers are known, which are worn away at least partially during operation in order to establish an accurately fitting surface. For example, in the case of guide vanes, the vane tips can abut a shroud of an adjacent rotor, whereby an accurately fitting arrangement of the guide vane tips relative to the rotor will be present during operation.

To produce running-in layers, thermal spraying methods are usually used, since the layers produced thereby already have a certain porosity and thus possess a correspondingly low strength or resistance to rubbing off or wear. Also, the porosity can be adjusted correspondingly by additional measures, as is described, for example, in JP 59 22 2 566 A. It is disclosed in this document that an NiCrAlY layer is thermally sprayed with a powder of organic material, so that with a correspondingly high temperature, the organic material will be vaporized and a porous layer will be produced.

Of course, thermally sprayed layers have limitations with respect to materials that can be used, since a high chemical reactivity is given to the particles being coated due to the high temperatures used.

Additional measures, such as introducing organic material to produce pores, also lead to considerable expenditure.

DISCLOSURE OF THE INVENTION

Problem of the Invention

Therefore, the problem of the present invention is a method for producing a running-in layer on a component, in particular to provide a blade of a gas turbine or a correspondingly produced component, which makes possible a higher flexibility of material selection and simultaneously requires a lower manufacturing expenditure, whereby at the same time, the functionality of the running-in layer will not be adversely affected.

Technical Solution

This problem is solved by a method with the features of claim 1 as well as a component with the features of claim 10. Advantageous embodiments are the subject of the dependent claims.

According to the present invention, kinetic cold-gas compacting is utilized for applying a running-in layer, which is worn away at least partially to form an accurately fitting surface during the operation of a gas turbine. By means of kinetic cold-gas compacting, which is carried out at low temperatures, a running-in layer made of a titanium alloy can be applied particularly onto components (preferably blades of a gas turbine) that are formed from a titanium material, without changing or influencing the layer material in an unfavorable way during its introduction, for example, due to a corresponding change in the chemical composition. In addition, the necessary structure, in particular porosity, which is important for the running-in properties, can be adjusted in a simple way with kinetic cold-gas compacting.

Correspondingly, the running-in layer can be applied so that a defined porosity will be established in the running-in layer.

The running-in layer may be formed form the most varied materials, whereby nickel-based alloys, cobalt-based alloys or titanium alloys can be used especially for jet turbines. In particular, running-in layers can be produced on a main body that is essentially formed from the same material, thus, for example, a nickel-based running-in layer on a nickel-based alloy or a titanium alloy as a running-in layer on a main body made of a titanium alloy.

Essentially means that the plurality of alloy components used is predominantly the same or contained for the most part in the same proportion in the alloy. Correspondingly, the same materials may essentially differ or vary in their composition in a minority of components.

In particular, nickel-based alloys with a composition that is the same or similar to the alloy IN718 (tradename of the Inconel company) or titanium alloys with a composition such as, e.g., Ti6Al4V, for the corresponding main body and/or the running-in layer may find use.

Although the running-in layer and the main body can be formed essentially from the same materials, the running-in layer can be applied in such a way that it differs in its properties from the main body, in particular with respect to its strength and/or structure. For example, the running-in layer may have a correspondingly high porosity, so that the strength or resistance to rubbing away or wear is reduced in order to obtain favorable running-in conditions. Favorable running-in conditions in this connection means that the material of the running-in layer can be easily rubbed away, in particular against the corresponding rubbing partner, thus the abutting component against which the surface must be accurately fitted. Depending on the case of application, this can be adapted, e.g. to the use conditions of guide vanes or rotating blades. In the case of rotating blades, in this connection, one frequently also speaks of a run-in coating, in contrast to the running-in layer for guide vanes, but which will be viewed as equal in meaning in the scope of this disclosure, so that a run-in coating will also be understood as a running-in layer, and vice versa.

In particular, the material of the running-in layer can be selected so that against a rubbing partner made of yttrium-stabilized zirconium oxide or aluminum oxide, the material wear essentially occurs on the running-in layer. Essentially on the running-in layer in this case means that the rubbing away occurs, exclusively or predominantly, on the rubbing layer between running-in layer and the opposite-lying rubbing partner, thus with more than 50%, in particular more than 75%, preferably more than 90% of the material wear on the running-in layer.

According to the invention, kinetic cold-gas spraying is used for applying the running-in layer. For kinetic cold-gas spraying, the process parameters can be selected in the range of 300° C. to 900° C. operating temperature, in particular 400° C. to 750° C., and/or a gas pressure, with which the particles on the surface being coated are accelerated, in the range of 20 to 50 bars, in particular 30 to 40 bars. Correspondingly, the particle velocity of the particles accelerated onto the surface being coated in kinetic cold-gas spraying can lie in the range of 500 to 1200 m/s, in particular 700 to 1000 m/s, whereby the particles used may have a size of 5 µm to 100 µm, especially 10 µm to 50 µm.

By means of the method of kinetic cold-gas spraying that is used, in particular, components made of a titanium material, such as blades of a gas turbine or jet turbine made of a titanium material, can be provided with a running-in layer that is formed as a porous layer. The porous layer can be executed by means of the application of kinetic cold-gas compacting with low process temperatures so that essentially no oxides are present in the layer, or the oxide content is smaller than or equal to 5‰ by weight or volume, in particular smaller than or equal to 2‰ by weight or volume. Essentially free of oxides means that the oxide proportion lies below the detection limit, particularly in a range that is smaller than or equal to 1‰ by weight or volume.

The porosity of the running-in layer may lie in the range of a pore fraction of 10 to 30 vol. %, in particular 15 to 20 vol, %, whereby this applies in general to all types of running-in layers, thus layers based on nickel-based alloys, titanium alloys or other alloys.

BRIEF DESCRIPTION OF THE FIGURES

Further advantages, characteristics and features of the present invention will be made clear in the following detailed description of an example of embodiment based on the appended figures. The drawings show in a purely schematic way.

EXAMPLE OF EMBODIMENT

Figure 1:
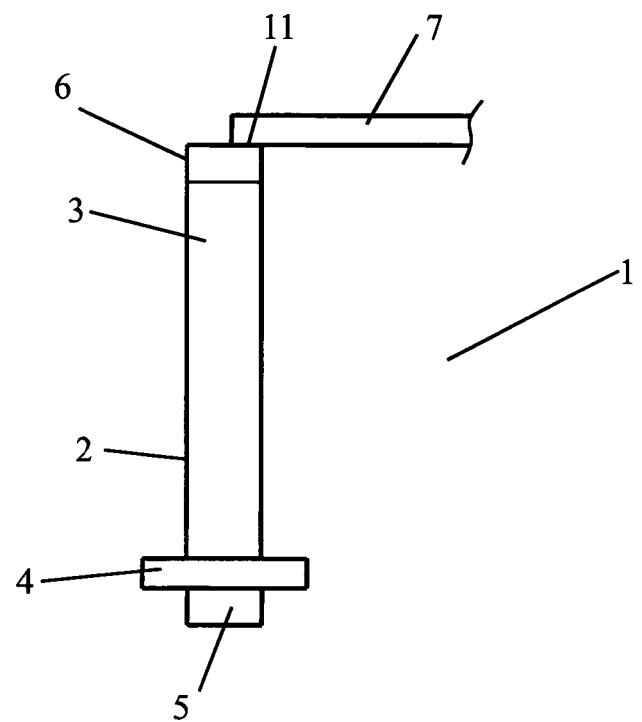
FIG. 1 a schematic representation of a blade of a gas turbine with a running-in layer according to the invention.

FIG. 1 shows a component of a gas turbine, in particular a jet turbine, in the form of a turbine blade or compressor blade 1, in which the present invention can be introduced. Blade 1 has a blade main body 2 with a blade portion 3 and a blade foot 5, which may comprise a molded part 4 for the form-fitting insertion of blade 1 into a disk. The present invention can be used both for rotating blades, which move during the operation of the turbine, as well as for stationary guide vanes. The present example of embodiment relates to a guide vane, which is disposed in stationary manner in the gas turbine.

At the tip of the vane, a running-in layer 6 is provided, which is disposed so that it accurately fits with an adjacent component 7, such as, for example a shroud of an adjacent rotor.

In order to make possible an accurately fitting arrangement of blade 1 and the adjacent rotor component 7, the parts are designed so that they are in friction contact with one another at least at the operating temperature. When the gas turbine is run in, corresponding to the friction contact, material on the contact surface 11 is rubbed away, so that an exact, accurately fitting contact surface 11 is formed.

The running-in layer is now designed so that material of running-in layer 6 and not of the adjacent rotor component 7 will be essentially rubbed away, i.e. completely or predominantly. Rotor component 7 can be formed correspondingly from a very hard material that is resistant to erosion and wear, such as yttrium-stabilized zirconium oxide or aluminum oxide.

Running-in layer 6 is manufactured from a nickel-based alloy or a titanium alloy, depending on the material used for blade main body 2 or blade part 3.

NiCoCrAlY alloys are used in particular as nickel-based alloys for the blade basic material as well as for the running-in layer.

Of course, the running-in layer is constructed in a different way than the material of blade main body 2 relative to its structure, so that a lower strength and thus a lower resistance to abrasion or wear results. In particular, the running-in layer may have an appropriate porosity, so that the strength or resistance to wear and abrasion is reduced by the pore structure.

The pore structure can be adjusted correspondingly when applying the running-in layer. For this purpose, according to the invention, kinetic cold-gas compacting is used as the method for applying running-in layer 6 onto blade part 3.

Figure 2:
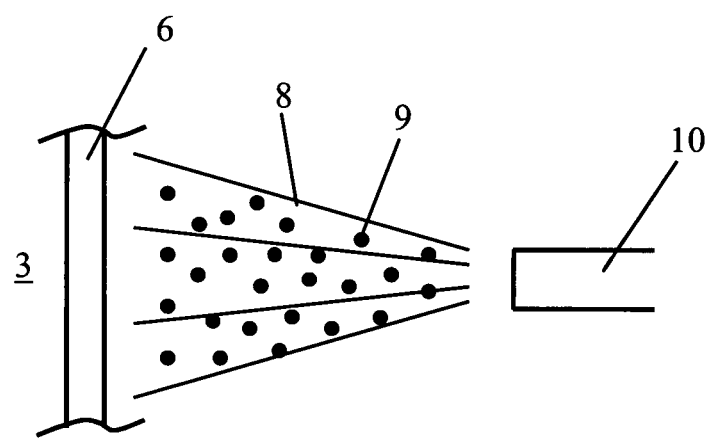
FIG. 2 a representation of the principle of kinetic cold-gas compacting

The principle for applying a running-in layer 6 onto blade part 3 by means of kinetic cold-gas compacting, also called K3, is shown schematically in FIG. 2.

Particles 9 of the material to be coated are accelerated from a corresponding nozzle device 10 in a jet 8 onto the surface of blade part 3 being coated, whereby upon striking the surface, the accelerated particles are deformed and flow into one another due to plastic deformation and form a compact layer 6. Due to the high velocity of impact, which can lie in the range of 500 to 1300 m/s, and is obtained by means of correspondingly high gas pressures of 20 to 50 bars in the region of nozzle arrangement 10, low temperatures in the range of 300° C. to 900° C. can be used for kinetic cold-gas compacting, and in contrast to the higher temperatures employed during thermal spraying, these lower temperatures lead to the circumstance that fewer chemical reactions of the coating material occur during the coating. Correspondingly, with kinetic cold-gas compacting, in particular, a running-in layer 6 with a titanium alloy that does not have or has only a very small or sufficiently small fraction of oxygen and particularly oxide can be produced on a blade main body 2 made of a titanium material, due to the advantageous application method. Simultaneously, however, the necessary structure of the running-in layer, i.e., in particular, an appropriate porosity can be established by the method, and this porosity provides the necessary rubbing-away properties. A running-in layer 6 can be particularly formed from a titanium alloy. Therefore, suitable running-in layers can be produced in a simple and defined manner, especially for blades of a gas turbine made of a titanium material.

Although the present invention has been described in detail on the basis of the example of embodiment, it is obvious to a person skilled in the art that the invention is not limited to this example of embodiment, but rather that modifications or changes can be conducted in a way that individual features are omitted and/or other combinations of the presented features are carried out, without departing from the protective scope of the appended claims.

The invention claimed is:

1. A method for producing a blade for a gas turbine, the method comprising the steps of: providing a main body (2) having a blade tip, applying onto the main body (2) a running-in layer (6), which can be rubbed away at least partially to form an accurately fitting surface (11) during operation, wherein
the running-in layer is applied by kinetic cold-gas compacting;
the running-in layer is introduced on the blade tip; and
wherein the running-in layer (6) has a porosity in the range of a pore fraction of 10 to 30 percent by volume;
wherein a nickel-based allo is applied as the running-in layer (6), and the nickel-based alloy is NiCoCrAlY.

2. The method according to claim 1, wherein the nickel-based running-in layer is applied onto a main body (2) containing a nickel-based alloy.

3. The method according to claim 1,
wherein
the nickel-based alloy of the main body and/or the nickel-based alloy of the running-in layer has (have) a composition having at least 40 wt. % or vol. % nickel.

4. The method according to claim 1,
wherein
the running-in layer (6) and the main body (2) are essentially formed from the same materials and the running-in layer is applied so that it differs only in strength and/or structure, particularly in porosity.

5. The method according to claim 1,
wherein
the material of the running-in layer is selected so that against a rubbing partner made of yttrium-stabilized zirconium oxide or aluminum oxide, the material wear essentially occurs on the running-in layer.

6. The method according to claim 1,
wherein
kinetic cold spraying is conducted at a temperature of 300° C. to 900° C. and/or a pressure of 20 to 50 bars and/or with a particle velocity of 500 to 1200 m/s and/or the particles used lie in the size range of 5 μm to 100 μm.

7. The method according to claim 1,
wherein
the blade is a guide vane.

8. A blade for a gas turbine having a main body (2) and a blade tip onto which a running-in layer (6) is applied, which can be worn away at least partially to form an accurately fitting surface (11) during operation,
wherein
the running-in layer (6) is a porous layer made of a nickel-based alloy; and
the running-in layer has a porosity in the range of a pore fraction of 10 to 30 percent by volume;
wherein the nickel-based alloy of the running-in layer is NiCoCrAlY.

9. The blade according to claim 8,
wherein
the porous layer is essentially free of oxides.

10. The blade according to claim 8,
wherein
the main body (2) is formed of a Ti alloy.

11. The blade according to claim 8,
wherein
the running-in layer (6) and the main body (2) are formed essentially from the same material and the running-in layer differs only in strength and/or structure.

12. The blade according to claim 8,
wherein
the material of the running-in layer (6) is selected so that against a rubbing partner made of yttrium-stabilized zirconium oxide or aluminum oxide, the material wear essentially occurs on the running-in layer.

* * * * *